Sept. 29, 1959
J. J. BRELL
2,906,503
EARTH-BORING APPARATUS
Filed April 22, 1958
4 Sheets-Sheet 1
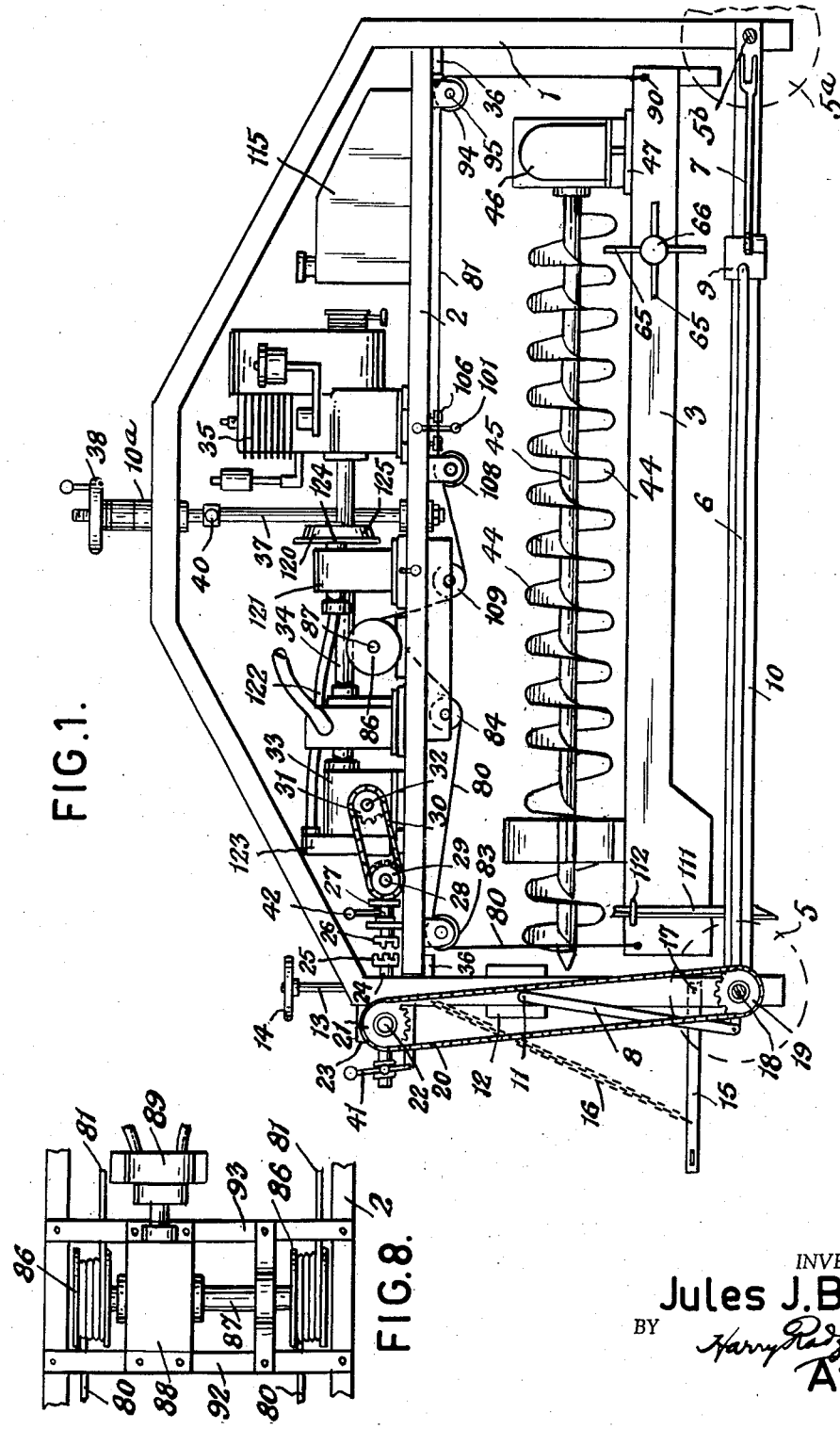
INVENTOR.
Jules J. Brell
BY
Harry Radzinsky
Atty

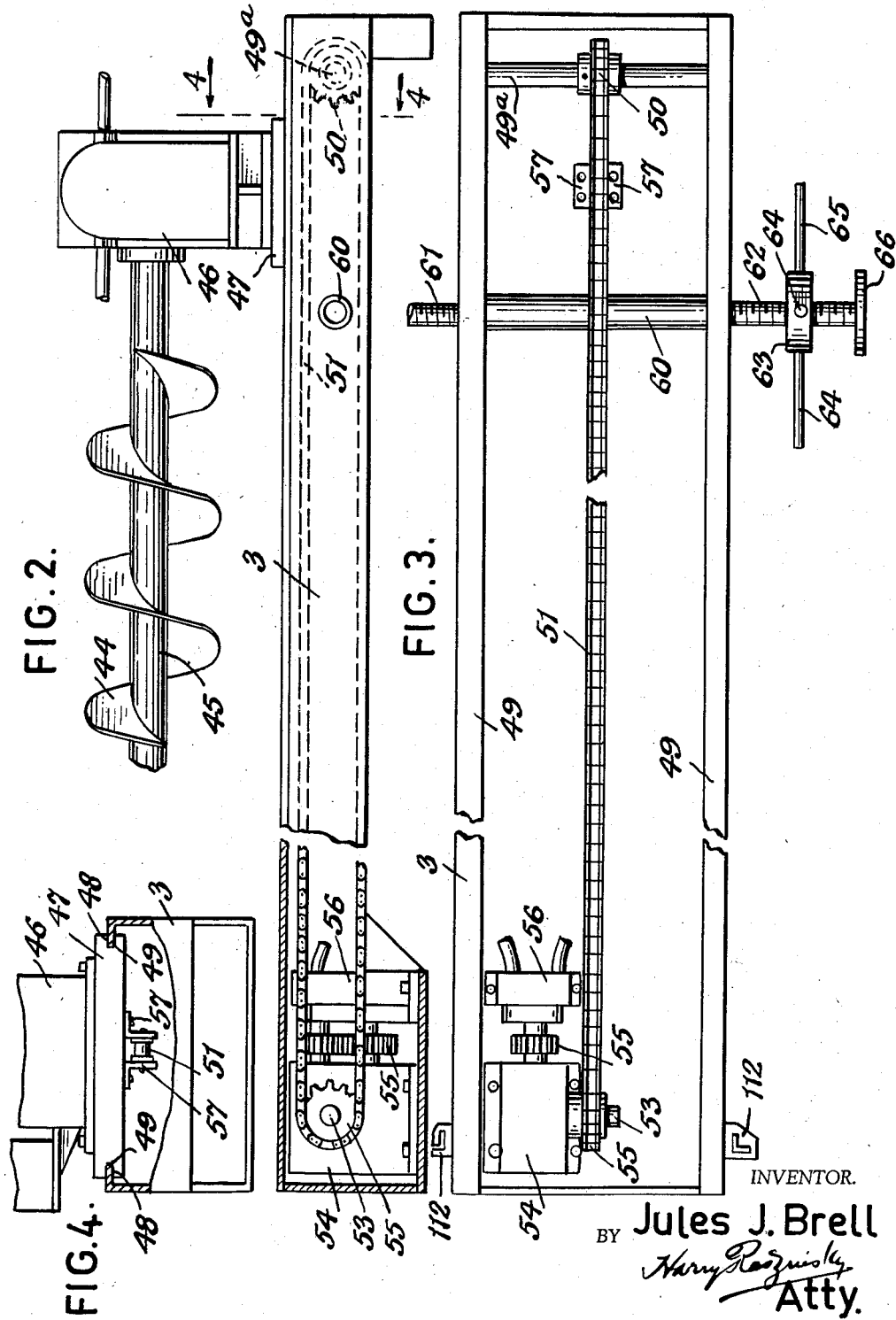

Sept. 29, 1959 J. J. BRELL 2,906,503
EARTH-BORING APPARATUS
Filed April 22, 1958 4 Sheets-Sheet 3

INVENTOR.
Jules J. Brell
BY Harry Radzinsky
Atty.

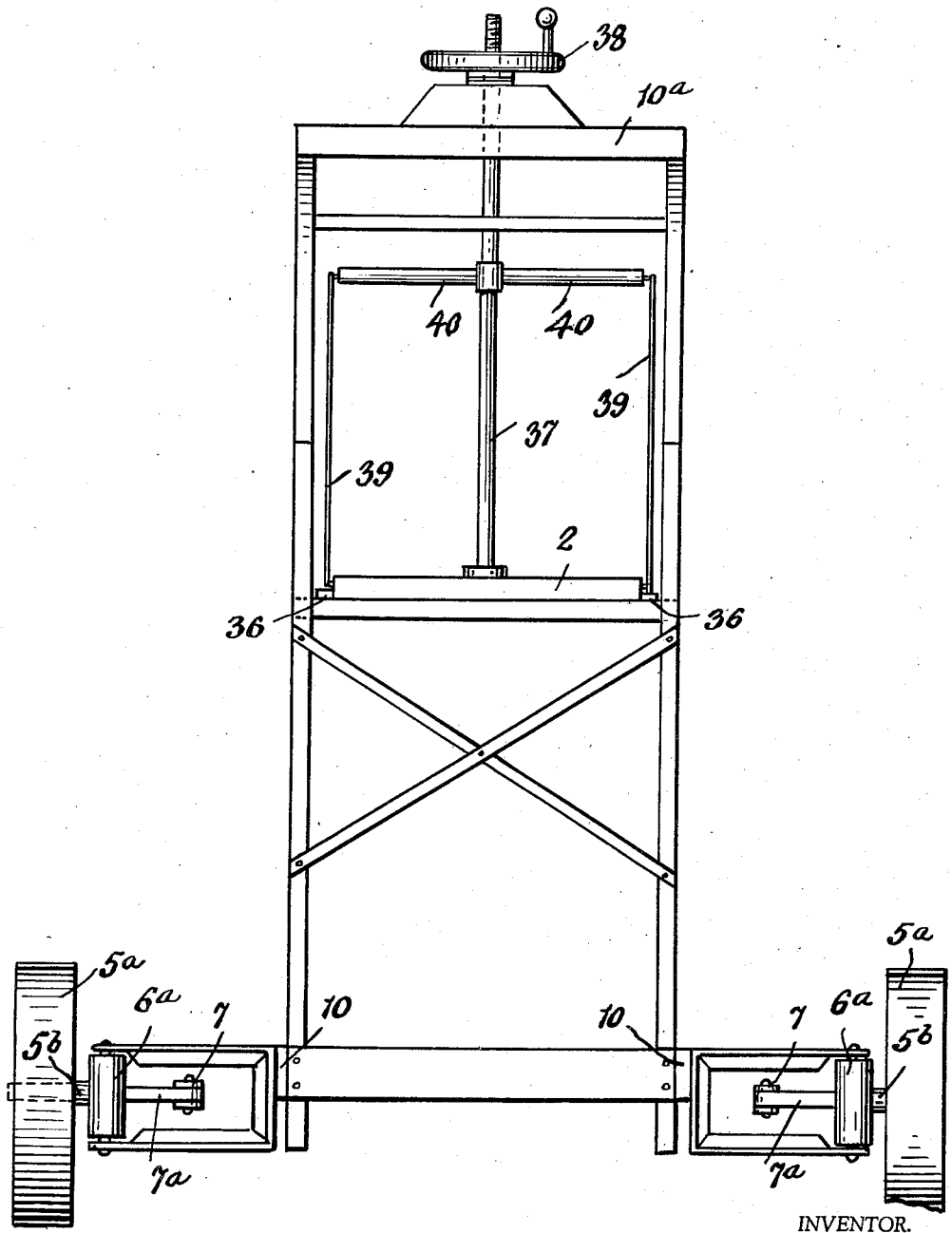

United States Patent Office 2,906,503
Patented Sept. 29, 1959

2,906,503

EARTH-BORING APPARATUS

Jules J. Brell, Baldwin, N.Y.

Application April 22, 1958, Serial No. 730,101

7 Claims. (Cl. 255—20)

This invention relates to earth-boring apparatus and more particularly to an apparatus employed for horizontal boring such as is required for the installation of sewer pipes, drainage piping or conduits of various kinds.

It is an object of the present invention to provide an apparatus of this character particularly adapted to bore the earth and produce horizontal or substantially horizontal borings, and especially in locations where piping or conduits are required to be installed without the disturbance of lawns, gardens, sidewalks, driveways or roads. It is an object of the invention to provide an apparatus of this character which will effectively operate in congested locations or in close quarters; which can be used, for example, when a space between two tranches or other excavations must be joined by piping and such space cannot be expeditiously or conveniently excavated from above.

It is another object of the invention to provide an apparatus of this character which shall include a wheeled vehicle that can be driven to and positioned over an excavation, and from which an auger-support can be lowered into the excavation and therein operated to move its auger both rotatively and axially to thereby produce a boring extending from the excavation to the desired point of termination. It is still another object of the invention to provide a mount in the frame of the vehicle for power means for the propulsion of the vehicle; for the raising and lowering of the auger-support; for the rotative and axial movement of the auger, and including also pipe-cutting means useful for cutting and tapering pipe to be installed in the bored passage.

With these and other objects to be hereinafter set forth, I have devised the arrangement of parts to be described and more particularly pointed out in the claims appended hereto.

In the accompanying drawings, wherein an illustrative embodiment of the invention is disclosed:

Fig. 1 is a side elevational view of an earth-boring apparatus constructed according to the invention;

Fig. 2 is a side elevational view, with some parts fragmentarily shown and other parts in section, of the auger and its supporting platform;

Fig. 3 is a top plan view of the auger-support, with the auger and its driving means omitted;

Fig. 4 is a sectional view, taken substantially on the line 4—4 of Fig. 2, looking in the direction of the arrows;

Fig. 8 is a top plan view of a part of the power platform, showing the drums for the suspension cables for the auger-support; and Fig. 9 is a view looking at the front end of the frame of the vehicle.

Figure 5:
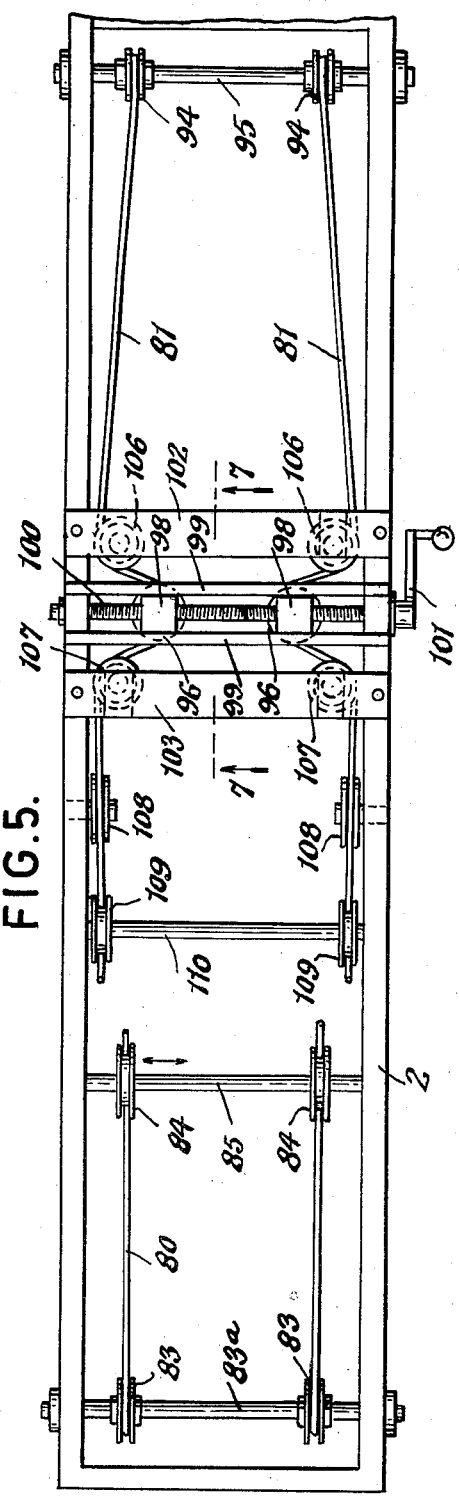
Fig. 5 is a top plan view of the power platform, with most of the power-providing elements removed in order to more clearly show and completely disclose the means for raising and lowering the auger-support.
Figure 6:
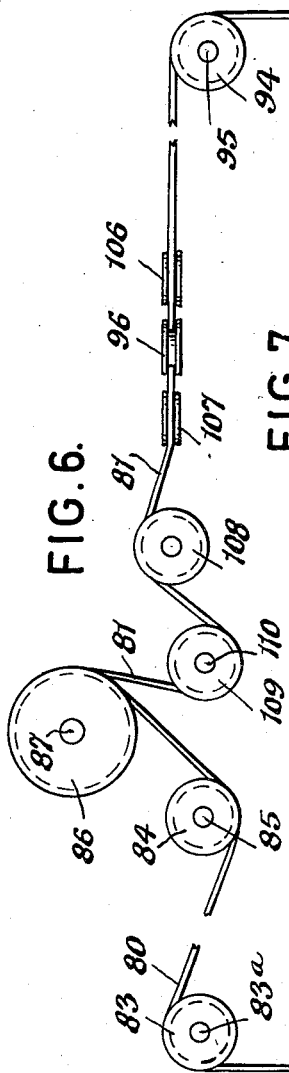
Fig. 6 is a diagrammatic view showing the course of the cables which raise and lower the auger-support.

The earth-boring apparatus shown in the drawings is primarily, although not necessarily, intended for boring horizontal or substantially horizontal holes such as are required for the installation of sewer pipes, drainage conduits, or for other purposes. In many instances these holes are required to be bored in relatively close quarters, and often in cases when shrubbery, sidewalks, driveways or other surfaces must not be disturbed. With the present invention, work of this nature may be readily carried on with a minimum of disturbance to the surroundings adjacent to the site of installation of the piping.

The apparatus includes a vehicle which can be readily driven to the point of boring; it includes an auger platform suspended from the vehicle, and which is lowered into a relatively small excavation that has been previously prepared; the auger platform is positioned in the excavation and the auger then set in operation to produce the boring.

In the drawings, the frame of the vehicle is generally indicated at 1, and the same is supported on wheels, the rear pair thereof being indicated at 5 and the steerable front wheels being indicated at 5a. Said front pair of wheels is steerable by means of steering gear which includes at both sides of the frame, rods 6 and 7, the rods 7 being connected to the arms 7a extending from the king-pins 6a (Fig. 9) on which the axles 5b of the front wheels 5a are mounted. The rods 6 extend to the rear of the vehicle where they are pivotally connected to the lower ends of levers 8. Rods 6 and 7 are pivotally attached to slidable guide blocks 9 which are slidable along the lower frame members 10. The upper ends of the levers 8 are secured to a shaft 11 extending from a gear box 12 which contains gearing of conventional form serving to swingably move the arms 8 back or forth as required, to thereby steer the front wheels 5a in the desired direction.

Extending upwardly from the gear box 12 is a steering post 13, terminating in a steering wheel 14 for manipulation by the operator of the vehicle and who stands upon a platform 15 pivotally mounted at the rear of the vehicle. The platform is supported in its lowered position by means of the chains 16, and being pivoted at one end, as indicated at 17, it can when desired be swung upwardly and held in its raised position by suitable retaining catches, or hooks and eyes, to keep it out of the way while the apparatus is in operation.

The rear wheels 5 of the vehicle are secured on the rear axle 18 which carries a sprocket 19 which engages with a chain 20 that extends upwardly and engages with a sprocket 21 secured on a shaft 22 extending from a gear box 23. Also extending from the gear box 23 is a clutch shaft 24, carrying a clutch dog 25 adapted for engagement with a dog 26 carried at the end of a drive shaft 27 connected by bevel gearing not shown, to a cross shaft 28 on which a sprocket 29 is mounted. A chain 30 extends from sprocket 29 to a sprocket 31 secured on a shaft 32 extending from a gear-reduction device 33. The gearing in the gear-reduction device 33 is driven by a shaft 34 extending from a source of power such as the internal combustion engine indicated at 35.

The engine 35, the gear-reduction device 33 and mechanism associated therewith, is mounted on a platform 2 which for convenience, is herein referred to as the "power platform," and which, when the apparatus is in normal boring operation, is usually supported within the vehicle frame 1 upon the rests or supports 36 located at the opposite ends of the frame 1. The power platform 2, including the various elements supported by it, and to be later described, is capable of raising and lowering movement to a limited extent, and can thus be elevated from off the supports 36 and it may also be pivotally moved around a vertical axis defined by a central post indicated at 37. Said post 37 is secured at its lower end to a cross member on the power platform, and is screw-threaded at its upper end, which end is adjustable through the cross member 10a at the top of the frame 1, and a hand-wheel 38 threadably engaging the post 37, enables the post and the power platform supported by it to be raised or lowered as required. For additionally supporting and stabilizing the power platform 2 from the post 37, wires 39 are provided, said wires extending from arms 40 projecting radially from the post 37 and being connected to the sides of the platform 2, as shown in Fig. 9.

From the foregoing, it will be apparent that an operator standing on the platform 15 may drive and guide the vehicle by means of the steering wheel 14 and clutch control lever 41. In addition, a forward and reverse control is provided, the details of which are not shown because it is of known construction and includes the control lever 42, by manipulation of which the vehicle may be caused to move forwardly or backwards.

At 3 is shown the auger-support carrying the auger 44, the shaft 45 of which is rotatably driven by the hydraulic motor 46 slidably mounted on the auger-support 3. Said motor 46 is mounted on a base plate 47 which has its opposite edges grooved as shown at 48 (Fig. 4) to receive the flanges 49 on the support 3. Mounted on a cross shaft 49a adjacent to one end of the auger-support 3 is a sprocket 50, and a chain 51 extends around the sprocket and also engages with a sprocket 52 on a shaft 53 located adjacent to the opposite end of the support 3. Shaft 53 is part of a gear reducer 54 which is housed in one end of the support 3, and said gear reducer is driven from gearing 55 operative from a hydraulic motor 56. Brackets 57, fastened to the chain 51 are secured to the under side of the base plate 47 so that as the chain 51 is moved by the action of the hydraulic motor and the parts associated therewith, the auger 44 will be advanced or retracted as required during the boring operation.

The frame 1 is open at the bottom so that when the vehicle is positioned over a trench or other excavation, the auger-support 3, carrying the auger 44, can be lowered down through the open bottom of the frame and into the excavation preparatory to the boring operation. The auger-support or platform 3 is carried on cables shown at 80 and 81. Cables 80 are secured at one end to the support 3, as indicated at 82 in Fig. 1. Each cable 80 extends over a roller 83 carried by shaft 83a, and then passes under an idle roller freely mounted on a shaft 85 (Fig. 5). The two idle rollers 84 are mounted for sliding movement on the shaft 85 to enable the cables 80 to evenly wind on the drums 86 on the shaft 87. Shaft 87 extends from reduction gearing 88 operated from a hydraulic motor 89.

The hydraulic motor 89 and the gearing 88 driven therefrom are mounted on cross bars 92 and 93 extending between the longitudinal side bars of the power platform 2.

Figure 7:
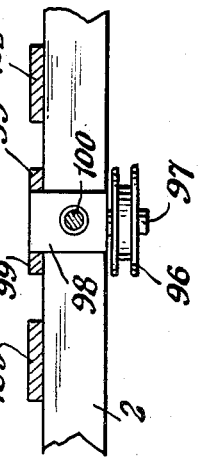
Fig. 7 is a sectional view, taken substantially on the line 7—7 of Fig. 5, looking in the direction of the arrows.

Two cables designated at 81 are fastened at one end to the second end of the auger-support 3, as indicated at 90, and these cables extend upwardly over the rollers or pulleys 94 on shaft 95. After passing over the pulleys 94, the cables 81 extend around pulleys 106 mounted for rotation on studs supported from a cross bar 102. After leaving pulleys 106, the cables 81 extend around adjustable pulleys 96. Each of the pulleys 96 is rotatably carried on a stud 97 (Fig. 7) extending downwardly from a guide block 98 slidably mounted between guide bars 99 extending across the platform 2 and connected to the longitudinal side bars of the same. The two guide blocks 98 threadably engage a screw-threaded shaft 100 rotatably mounted in the longitudinal side bars of the platform 2 and terminating in a crank 101 by which the shaft 100 can be rotated to thus move the pulleys 96 toward or away from one another to thereby either shorten or lengthen the effective length of the cables 81 and thus tilt or incline the auger to a desired angle when a boring which deviates from a true horizontal is required. After passing around the pulleys 96, the cables 81 engage pulleys 107 rotatably carried on studs on a cross bar 103, then passing over idle pulleys 108, under pulleys 109, slidable on shaft 110 to wind up on the drums 86. The above-described arrangement is such that by operation of the hydraulic motor 89 and gearing 88, the auger-support can be raised or lowered to occupy either the inoperative position shown in Fig. 1 or else be located down through the open bottom of the frame 1 and into an excavation to perform the boring operation. By manipulation of the crank 101, the auger support may be titled to any required degree for boring at a desired angle.

When the auger-support is lowered into an excavation and positioned as required therein, it is anchored and stabilized by means of the stakes 111 inserted through lugs 112 provided on the sides of the auger support 3 near one end of the same. Near the opposite ends of the auger support jacks are provided. Each jack consists of a threaded rod 62, threadably received in an internally threaded sleeve 60 extending across the support. The rods 62 are adjusted in and outwardly of the sleeve by hand-wheels 63 having radial spokes 65. Each of the rods 62 terminates in a head or disc 66 operative against the interior wall of the excavation into which the auger-support is lowered.

The operation of the improved earth-boring apparatus is briefly as follows:

The vehicle is driven to the site of boring and positioned over the excavation. By operation of the hydraulic motor 89 and parts associated therewith, the auger-support is lowered down through the open bottom of the frame 1 and into the excavation. When positioned in the excavation, the auger-support is fixed by the stakes 111 and the jacks 62. Hydraulic motor 46 is set in operation as well as motor 54 so that the auger is then rotated as well as axially moved forwardly to form the boring. At the completion of the boring the auger is retracted to its position of Fig. 2 and the auger-support elevated out of the excavation and restored to the position shown in Fig. 1.

In the drawings, the hydraulic conduits or hose connections between the several hydraulic motors and the hydraulic supply tank 115 are not completely disclosed in order to avoid complexity of illustration. These elements as well as the valves for controlling the flow of hydraulic fluid to the parts of the hydraulic apparatus are of known construction.

The mounting of the power platform and the auger-support suspended therefrom are such that when the parts are in the inoperative position shown in Fig. 1, the auger can be faced in either the direction therein shown, wherein its entering end is directed toward the left, or it can be faced in the opposite direction so that after completing a boring toward the left, the auger and its support can then be raised out of the excavation, reversed, or faced toward the right and then returned into the excavation to begin boring in axial alignment with the first hole but in the opposite direction. This is done by raising the auger-support out of the excavation to bring it into the position shown in Fig. 1; then raising the power platform slightly off the supports 36 by manipulation of the hand-wheel 38 and then swinging the platform 2 and the suspended auger-support 3 around a vertical axis as defined by the post 37 for 180 degrees, thus facing the auger in a direction opposite to that in which it was faced before being raised and swung as above described. The auger-support can then be lowered into the excavation and the boring then proceeded with in the direction in which the auger is then facing.

As the borings produced by this apparatus are often employed for the installation of pipes or piping, a means is provided for cutting and tapering pipes of the character usually employed. This means consists of an abrasive wheel 120 rotated by gearing contained in a housing 121, which gearing is driven by a flexible power shaft 122 extending from gearing in a casing 123, the latter gearing being driven by the hydraulic motor 33. The abrasive wheel 120 is provided with a cutting flange 124 against which the periphery of the pipe to be cut is held while the pipe, rested on a support near the cutting wheel, is rotated. The flange thus cuts through the pipe or scores it sufficiently to enable it to be broken off. As the pipe comes nearer to the wheel during the cutting operation the tapered abrasive surface 125 of the wheel produces a taper on the pipe enabling it to fit readily into the couplings employed.

While I have herein described a single embodiment of the invention, it is obvious that the same is not to be restricted thereto, but is broad enough to cover all structures coming within the scope of the annexed claims.

What I claim is:

1. An earth-boring apparatus comprising, a frame having an open bottom, a platform located within the frame and suspended therefrom, said platform being adapted to be raised into the frame or lowered to position it at a desired location relatively to the frame, means for raising or lowering the platform, the suspension of the platform from the frame being such as to permit of rotatable shift of the platform about a vertical axis, means on the frame for supporting the platform at a fixed location within the frame, an auger-support suspended from the platform, means for raising or lowering the auger-support relatively to the platform to bring the same within the frame or to lower the same to a position below the frame to descend into an excavation over which the apparatus is positioned, an auger mounted for rotative and axial movement on the support, and power means mounted on the platform for raising and lowering the auger-support, and means on the auger-support for rotating and for axially moving the auger.

2. An earth-boring apparatus comprising, a wheeled vehicle, power means for propelling the same, said vehicle including an open-bottom frame adapted for positioning over an excavation, a platform suspended from the frame and mounted for rotation around a vertical axis and for raising and lowering movement relatively to the frame, an auger-support suspended from the platform and adapted to be raised or lowered to bring it within the frame or down through the open bottom of the frame and into an excavation below the frame, an auger mounted on the support and adapted for rotative and axial movement, power means mounted on the platform for raising or lowering the auger-support, drive means on the auger-support for rotating the auger, means on the auger-support for axially moving the auger, and means on the platform for tilting the auger-support to thereby regulate the boring angle of the auger.

3. An earth boring apparatus comprising, a frame for straddling a trench, a platform suspended from the frame and mounted for raising and lowering movement therein, an auger-support suspended from the platform and mounted for raising and lowering movement to bring it into the frame or to lower it down below the same to enter the trench, power means carried by the platform for raising and lowering the auger-support, power means on the auger-support for rotatively moving the auger, and means on the auger-support for axially moving the auger while it is in its lowered position in the trench.

4. An earth boring apparatus comprising, a wheeled vehicle provided with a frame, a platform suspended in the frame and capable of raising or lowering movement therein, said platform being also capable of rotative movement around a vertical axis, power means carried by the platform, means for supporting the platform from the frame and for raising and lowering the platform, an auger-support suspended from the platform and capable of being lowered to position it below the frame, an auger carried by the auger-support and rotatively and axially movable relatively to the same, means on the auger-support for rotating the auger, flexible means extending from the power means on the platform to said auger-rotating means to cause driving of the same, means on the auger-support for advancing or retracting the auger, and means operative from the platform for tilting the auger-support.

5. An earth boring apparatus comprising, a frame, a platform mounted therein and capable of raising and lowering movement and of rotative movement about a vertical axis, an auger-support suspended from the platform, cables for supporting the support from the platform, take-up means on the platform for the cables to regulate the effective length of the same to thereby raise or lower the auger-support relatively to the platform, means for regulating the effective length of selected cables to shorten such cables in a manner to tilt the support to regulate the boring angle of the auger, an auger carried on the support and slidably mounted relatively thereto, means on the support for rotating the auger, and means on the support for effecting a sliding movement of the auger during its rotative movement when boring.

6. An earth boring apparatus comprising, a frame, a platform suspended therein, an auger-support suspended from the platform, means on the platform for lowering the auger-support to position it below the frame and for raising it above the bottom of the frame, an auger mounted on the auger-support means on the auger-support for rotating the auger, means on the auger-support for axially moving the auger, and means in the frame for supporting the platform in a manner to permit of its being pivotally rotated around a vertical axis while positioned within the frame.

7. An earth-boring apparatus as provided for in claim 3, wherein the auger is connected to a first hydraulic motor mounted on the auger-support, the auger-support being movable in company with the auger into the trench, the hydraulic motor and auger connected thereto being slidably mounted on the support, and a second hydraulic motor mounted on the support and means driven thereby to slidably move the first hydraulic motor and auger longitudinally of the auger to advance the same during the boring operation.

References Cited in the file of this patent
UNITED STATES PATENTS

| | | |
|---|---|---|
| 1,943,103 | Benson | Jan. 9, 1934 |
| 2,394,194 | McCarthy | Feb. 5, 1946 |